(12) United States Patent  
Pennington

(10) Patent No.: US 7,068,175 B1
(45) Date of Patent: Jun. 27, 2006

(54) WATER LEVEL WARNING DEVICE

(76) Inventor: Larry Pennington, 741 E. 105th St., Chicago, IL (US) 60628

( * ) Notice: Subject to any disclaimer, the term of this patent is extended or adjusted under 35 U.S.C. 154(b) by 93 days.

(21) Appl. No.: 10/793,608

(22) Filed: Mar. 4, 2004

(51) Int. Cl.
*G08B 21/00* (2006.01)

(52) U.S. Cl. .................. 340/623; 340/624; 340/606; 340/618; 340/450

(58) Field of Classification Search ............ 340/623, 340/624, 603, 606, 618, 621, 450, 540; 73/290 R, 73/291, 298, 302, 303, 1.73
See application file for complete search history.

(56) References Cited

U.S. PATENT DOCUMENTS

| | | | | |
|---|---|---|---|---|
| 4,041,557 A | | 8/1977 | Ringler | 4/75 |
| 4,292,996 A | | 10/1981 | Pataki et al. | 137/393 |
| 4,433,577 A | | 2/1984 | Khurgin et al. | 73/290 |
| 5,076,101 A | * | 12/1991 | Lazure | 73/290 V |
| 5,275,216 A | | 1/1994 | Haedt | 141/95 |
| 6,008,728 A | * | 12/1999 | Wesey | 340/618 |
| 6,147,614 A | * | 11/2000 | Parish | 340/623 |
| 6,160,482 A | * | 12/2000 | Hill | 340/625 |

* cited by examiner

*Primary Examiner*—Hung Nguyen
(74) *Attorney, Agent, or Firm*—Goldstein Law Offices P.C.

(57) ABSTRACT

A water level warning device for use in conjunction with a bathtub or a sink, for audibly warning a user when the water flowing into the bathtub or sink has reached a predetermined level. The warning device comprises a cylindrical tube containing a floating ball and having a plurality of circular openings extending fully therethrough for allowing water from the bathtub or sink to enter the tube. The top of the tube has a pressure-activated sensor and a speaker in communication with the sensor. The height of the tube may be telescopically adjusted by the user, thereby allowing the user to set the level of water required to activate the sensor. In use, the floating ball floats upon the upper surface of the water entering the tube, and activates the sensor when the level of water reaches the top of the tube. Upon selective activation of the sensor, the speaker emits an audible alarm.

11 Claims, 3 Drawing Sheets

WATER LEVEL WARNING DEVICE

BACKGROUND OF THE INVENTION

1. Field of the Invention

The invention generally relates to a warning device, and in particular relates to a water level warning device for audibly warning a user when the water level within a structure has reached a predetermined water level above the base of said structure.

2. Description of the Related Art

Oftentimes, an individual needs to fill a bathtub or sink with a particular amount of water. This generally involves turning on a faucet, watching the bathtub or the sink as it fills with the desired amount of water, and then turning off the faucet. Often, the individual may desire to engage in an activity other than watching the bathtub or the sink as it fills with the desired amount of water. However, if the individual does not actually watch the water level as it rises, there is a risk that the water level will surpass the desired level and overflow from the bathtub or sink, thereby causing water damage or even a hazardous condition. Accordingly, there is a need for a water level warning device for audibly warning an individual when the water level within a bathtub or sink has reached a predetermined water level, so that the individual does not have to watch the water level as it rises within the bathtub or sink.

A variety of water level detectors are available. For example, U.S. Pat. No. 5,275,216 to Haedt appears to show a liquid overflow valve for a tank which provides an audible warning when the tank is full. Additionally, U.S. Pat. No. 4,433,577 to Khurgin appears to show the use of an inlet tube for metering the flow of liquid with a sensor incorporated to determine the level of liquid. Furthermore, U.S. Pat. No. 4,292,996 to Pataki appears to show a device capable of controlling the level and flow of liquid based on a pressure difference.

While these devices may be suitable for the particular purpose employed, or for general use, they would not be as suitable for the purposes of the present invention as disclosed hereafter.

SUMMARY OF THE INVENTION

It is an object of the invention to produce a water level warning device which audibly warns a user when water flowing into a bathtub or sink has reached a predetermined water level. Accordingly, the water level warning device has a floating ball which selectively activates a sensor in communication with a speaker. The rising level of water in the bathtub or sink causes the floating ball to contact the sensor, thereby causing the speaker to emit an audible alarm, thereby warning the user that the water has reached the predetermined water level within the bathtub or sink.

It is another object of the invention to produce a water level warning device which prevents water damage caused by an overflowing bathtub or sink. Accordingly, because the warning device emits an audible signal when the level of water has reached a predetermined level, a user is able to turn off the flow of water before overflow occurs, thereby preventing water damage caused by an overflowing bathtub or sink.

Other objects of the invention will become apparent in the detailed description which follows.

The invention is a water level warning device for use in conjunction with a bathtub or a sink, for audibly warning a user when the water flowing into the bathtub or sink has reached a predetermined level. The warning device comprises a cylindrical tube containing a floating ball and having a plurality of circular openings extending fully therethrough for allowing water from the bathtub or sink to enter the tube. The top of the tube has a pressure-activated sensor and a speaker in communication with the sensor. The height of the tube may be telescopically adjusted by the user, thereby allowing the user to set the level of water required to activate the sensor. In use, the floating ball floats upon the upper surface of the water entering the tube, and activates the sensor when the level of water reaches the top of the tube. Upon selective activation of the sensor, the speaker emits an audible alarm.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
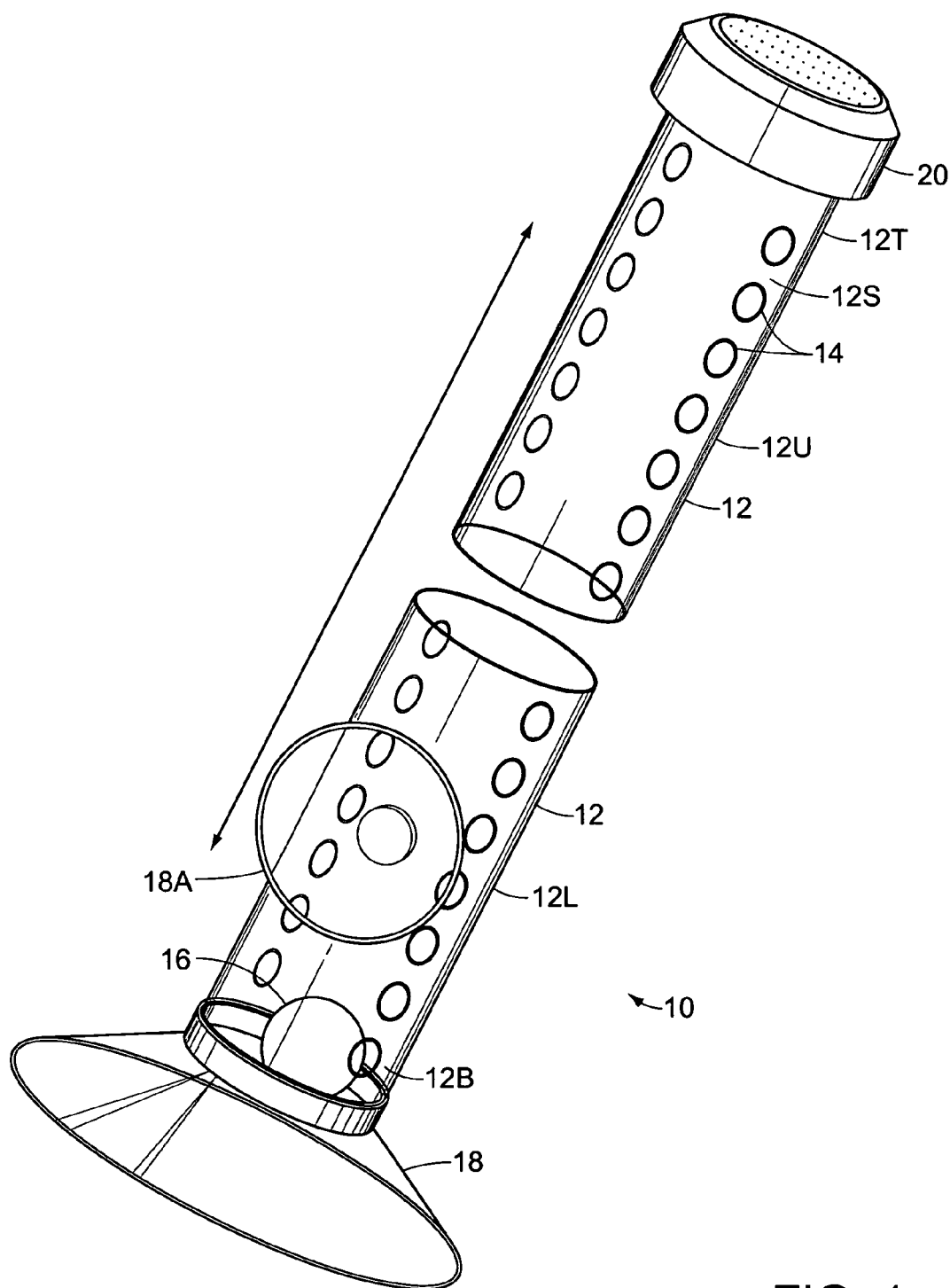
FIG. 1 is a perspective view of a water level warning device, wherein an upper portion of a tube is positioned for telescopic insertion within a lower portion of the tube, and wherein a double-headed arrow indicates directions of allowed motion of the upper portion within the lower portion.

FIG. 1 illustrates a water level warning device 10, for use in conjunction with a bathtub having a base and at least one side wall, and having a source of flowing water for filling the bathtub, said water within the bathtub having an upper surface. The warning device 10 audibly warns a user when water flowing into the bathtub has reached a predetermined level above the base of said bathtub, so that the user does not have to watch the water level as the bathtub fills with water. The water level warning device 10 comprises a telescopically adjustable, substantially hollow cylindrical tube 12 having a circular top 12T, a circular bottom 12B, and a curved side wall 12S having a plurality of vertically aligned circular openings 14 extending fully therethrough. The tube 12 has a substantially cylindrical lower portion 12L and a substantially cylindrical upper portion 12U. The upper portion 12U of the tube 12 is telescopically positionable within the lower portion 12L of the tube 12, thereby providing a warning device 10 whose overall height may be adjusted by the user. The adjusted height of the warning device 10 determines the height of the water level necessary for activating the warning device 10, as will be described. The circular bottom 12B of the tube 12 has a suction cup 18 attached thereunto, for firmly anchoring the warning device 10 to the base of the bathtub. The curved side wall 12S has a suction cup 18A attached thereunto, in order that the warning device 10 may be selectively attached to the side wall of the bathtub. The suction cups 18 and 18A selectively create a vacuum seal when pressed against the base or side wall of the bathtub, respectively. It should be noted that use of the warning device 10 is not restricted to use within a bathtub. Rather, the warning device 10 may be effectively used within any structure which selectively holds water and which is capable of being filled by a source of selectively flowing water. For example, the warning device 10 may be effectively used in conjunction with a sink or a bucket as it fills with flowing water, for audibly warning the user when the water level within the sink or bucket has reached a predetermined level.

Figure 3:
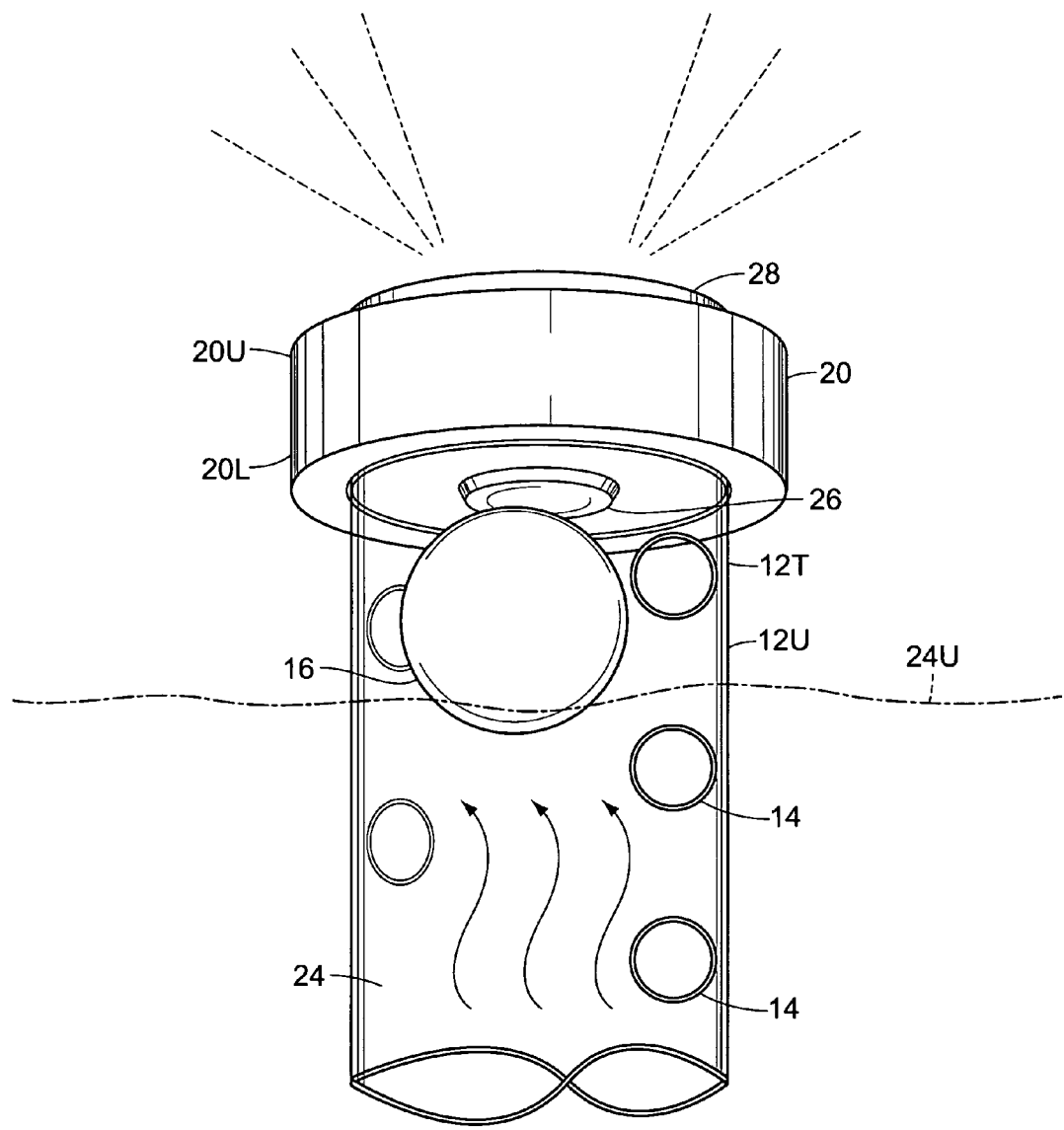
FIG. 3 is a perspective view of the upper portion of the tube and the cap, wherein the water level, indicated by hatched lines, is high enough to elevate the floating ball to activate the sensor within the cap, thereby causing a speaker to emit an audible alarm.

The water level warning device 10 further comprises at least one substantially spherical floating ball 16 selectively contained within the tube 12, and a cap 20 which seals the circular top 12T of the tube 12. The floating ball 16 floats upon the upper surface of the water which has entered the warning device 10 from the bathtub through the circular openings 14 extending through the tube 12. Turning momentarily to FIG. 3, the cap 20 has a lower portion 20L having a pressure-activated sensor 26, and an upper portion 20U having a speaker 28 in communication with the sensor 26. The speaker 28 emits an audible alarm upon activation of the sensor 26. The sensor 26 is selectively activated upon contact with the floating ball 16 when the upper surface of the water within the tube 12 elevates the floating ball 16 to substantially the top 12T of the tube 12. The sensor 26 and the speaker 28 are described in greater detail below.

Figure 2:
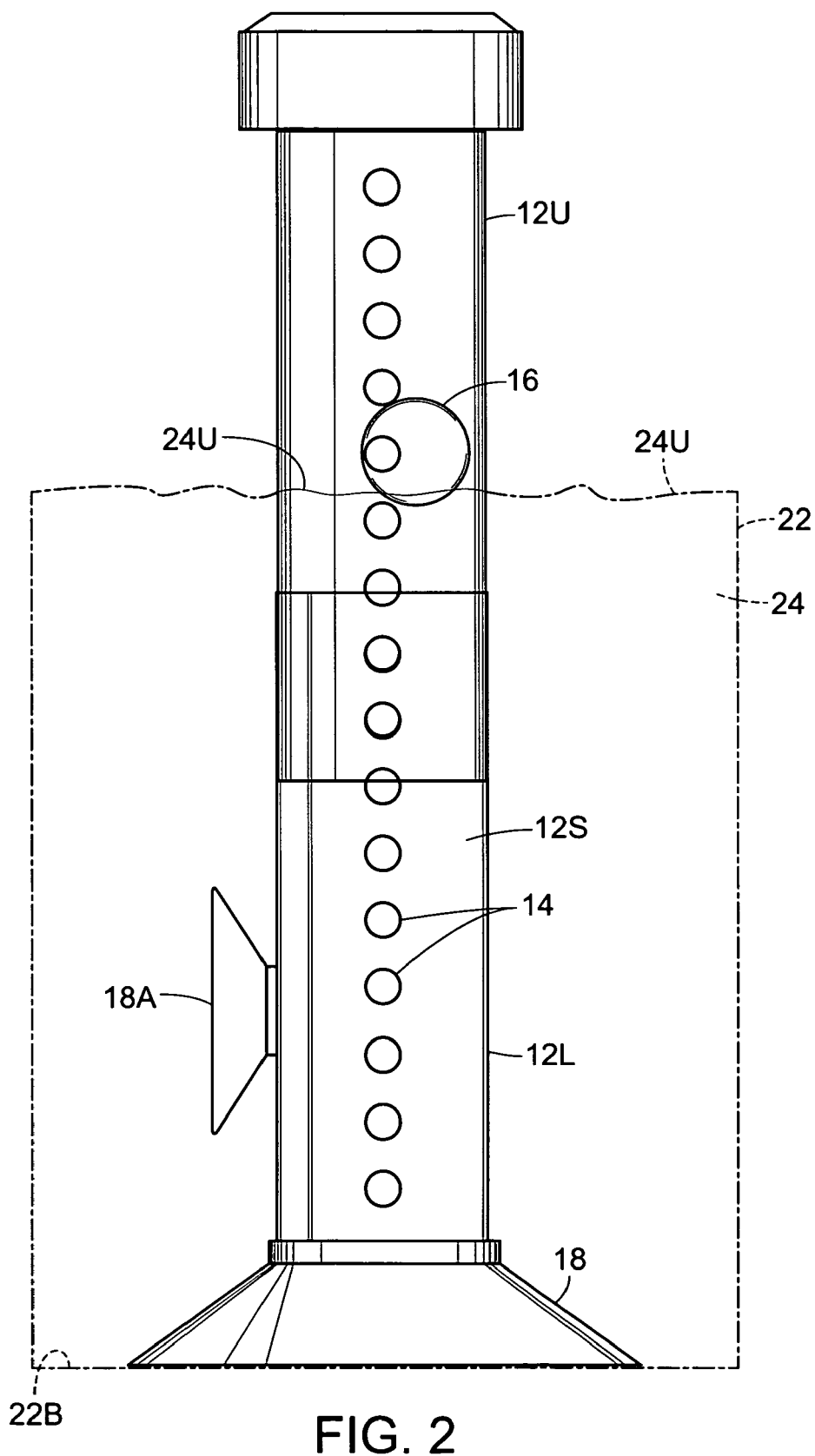
FIG. 2 is a front elevational view of the water level warning device positioned within a bathtub having a water level, indicated by hatched lines, which is not yet high enough to elevate a floating ball to activate a sensor within a cap.

FIG. 2 illustrates the water level warning device 10 positioned within a bathtub 22 having a substantially horizontal base 22B and having a quantity of water 24 contained therein, said water 24 having an upper surface 24U. The bathtub 22 has a faucet for selectively filling the bathtub 22 with water 24. The suction cup 18 has been selectively attached to the base 22B of the bathtub 22, prior to filling the bathtub 22 with water 24, in order to prevent the warning device 10 from inadvertently tipping over as the upper surface 24U of water 24 within the bathtub 22 rises. As the water 24 fills the bathtub 22, the water 24 within the bathtub 22 enters the tube 12 of the warning device 10 through the circular openings 14 in the curved side wall 12S of the warning device 10, thereby causing the floating ball 16 to rise along with the rising upper surface 24U of the water. While the warning device 10 is being deployed, the height of the upper surface 24U of the water 24 within the tube 12 is substantially the same as the height of the upper surface 24U of the water 24 within the bathtub 22 proper. In FIG. 2, the upper surface 24U of the water 24 within the bathtub 22 is not yet high enough to elevate the floating ball 16 to the position at which it contacts and thereby activates the sensor 26.

FIG. 3 illustrates the upper portion 12U of the tube 12 and the cap 20, wherein the upper surface 24U of the water 24 within the tube 12 has risen from the level illustrated in FIG. 2. The floating ball 16 has been floated upward by the rising water 24 to substantially the lower portion 20L of the cap 20. The rising floating ball 16 exerts pressure upon the pressure-activated sensor 26, thereby causing the speaker 28 in communication with the sensor to emit an audible alarm. Upon hearing the alarm, the user becomes aware that the upper surface 24U of the water 24 within the bathtub 22 has reached substantially the vertical height of the tube 12 of the warning device 10, and the user turns off the faucet of the bathtub 22 to prevent the water level from rising further. It is contemplated that the sensor 26 may be spring-activated or in the alternate, may be powered by electricity.

In use, the user first decides upon the optimal level of the water 24 within the bathtub 22. The user "sets" the warning device 10 to be activated at that particular water level by adjusting the overall height of the tube 12, by telescopically positioning the upper portion 12U of the tube 12 within the lower portion 12L of the tube 12, until the overall height of the tube 12 is just slightly greater than the optimal level of the upper surface 24U of water 24 within the bathtub 22. The user attaches the warning device 10 to the base 22B of the bathtub 22 by pressing the suction cup 18 firmly against the base 22B of the bathtub 22. Alternatively, the user may attach the warning device 10 to the side wall of the bathtub 22 by pressing the suction cup 18A firmly against the side wall of the bathtub 22. The user then turns on the faucet of the bathtub 22 and begins to fill the bathtub 22 with water 24. As the bathtub 22 fills with water 24, the water 24 gradually enters the tube 12 through the plurality of circular openings 14 extending through the curved side wall 12S of the tube 12. The rising upper surface 24U of water 24 elevates the floating ball 16. When the upper surface 24U of the water 24 has reached substantially the circular top 12T of the tube 12, the floating ball 16 contacts and presses against the sensor 26 positioned within the lower portion 20L of the cap 20, thereby activating the sensor 26, and thereby causing the speaker 28 in communication with the sensor 26 to emit an audible alarm. When the user hears the alarm, the user is alerted to the fact that the water 24 has reached the optimal level, and the user shuts off the faucet. The user removes the device 10 from the bathtub 22 by detaching the suction cup 18 from the base 22B of the bathtub 22, and may now use the bathtub 22 in the usual fashion.

In conclusion, herein is presented a water level warning device for audibly warning a user when water flowing into a bathtub has reached a predetermined level, so that the user does not have to watch the water level as the bathtub fills with water. The invention is illustrated by example in the drawing figures, and throughout the written description. It should be understood that numerous variations are possible, while adhering to the inventive concept. Such variations are contemplated as being a part of the present invention.

What is claimed is:

1. A water level warning device, for use by a user in conjunction with a structure capable of selectively holding a quantity of water, said structure having a base and also having a source of flowing water for selectively filling the structure with water, said water having an upper surface, said warning device capable of audibly warning a user when the upper surface of the water within the structure has reached a predetermined water level above the base of said structure, so that the user does not have to watch the upper surface of the water as the structure fills with water, said warning device comprising:

a telescopically adjustable, substantially hollow tube having a top, a bottom, and a side wall having a plurality of openings extending fully therethrough at various locations between the top of the tube and the bottom of the tube, said openings for allowing the water within the structure to selectively enter the tube, said tube having a lower portion and an upper portion, wherein said upper portion of the tube is selectively telescopically positionable with respect to the lower portion of the tube, in order to allow the user to adjust the overall height of the warning device;

a suction cup attached to the bottom of the tube, for selectively anchoring the warning device to the base of the structure;

at least one floating ball selectively contained within the tube, wherein said floating ball floats upon the upper surface of the water which has entered the tube of the warning device through the openings extending therethrough; and a cap which seals the top of the tube, said cap having a lower portion having a pressure-activated sensor, and an upper portion having a speaker in communication with the sensor, wherein the sensor is selectively activated upon contact with the at least one floating ball when a rising upper surface of the water causes the floating ball to reach substantially the top of the tube, wherein the speaker selectively emits an audible alarm upon selective activation of the sensor by the floating ball, and wherein a vertical height of the sensor above the base of the structure, and consequently an amount of water needed to float the floating ball up to the sensor, is selectively adjusted by adjusting the overall height of the warning device.

2. The water level warning device as recited in claim 1, wherein the tube is substantially cylindrical and has a circular top, a circular bottom, and a curved side wall.

3. The water level warning device as recited in claim 2, wherein the upper portion of the tube and the lower portion of the tube are each substantially cylindrical.

4. The water level warning device as recited in claim 3, wherein the at least one floating ball is substantially spherical.

5. The water level warning device as recited in claim 4, wherein the plurality of openings extending through the side wall of the tube are vertically aligned.

6. The water level warning device as recited in claim 5, wherein the plurality of openings extending through the side wall of the tube are circular openings.

7. The water level warning device as recited in claim 6, wherein the sensor is chosen from a group of sensors consisting of a spring-activated sensor and an electrically activated sensor.

8. The water level warning device as recited in claim 7, wherein the warning device has two floating balls.

9. The water level warning device as recited in claim 7, wherein the warning device has three floating balls.

10. The water level warning device as recited in claim 7, wherein the structure to be filled with water has a side wall, and wherein the warning device has a suction cup extending horizontally outward from the side wall of the warning device, in order that the warning device may be selectively attached to the side wall of the structure.

11. A method of using a water level warning device by a user having at least one hand and at least one ear capable of hearing, in conjunction with a structure capable of selectively holding a quantity of water having a water level, said structure having a base and also having a source of selectively flowing water for filling the structure with water, said water having an upper surface, said warning device for selectively audibly warning a user when the upper surface of the water within the structure has reached a predetermined level above the base of said structure, said warning device having a telescopically adjustable tube having a top, a bottom, and a side wall having a plurality of openings extending fully therethrough, said tube having a lower portion and an upper portion, wherein said upper portion of the tube is selectively telescopically positionable with respect to the lower portion of the tube, said warning device having a suction cup attached to the bottom of the tube, at least one floating ball selectively contained within the tube, and a cap which seals the top of the tube, said cap having a pressure-activated sensor and a speaker in communication with the sensor, said method comprising the steps of:

a) setting the warning device to be activated at a particular water level by telescopically positioning the upper portion of the tube within the lower portion of the tube by the user, until an overall height of the tube is just slightly greater than a desired water level within the structure;

b) attaching the warning device to the base of the structure by pressing the suction cup against the base of the structure with the at least one hand of the user, in order to prevent the warning device from inadvertently tipping over as the water level within the structure rises;

c) gradually filling the structure with a source of flowing water, thereby causing the water to gradually enter the tube through the plurality of openings extending through the side wall of the tube, thereby causing the at least one floating ball to rise within the tube along with a rising upper surface of the water;

d) activating the sensor by contacting the sensor with the floating ball when the upper surface of the water reaches substantially the top of the tube, and thereby causing the speaker in communication with the sensor to emit an audible alarm;

e) alerting the user that the upper surface of the water has reached substantially the top of the tube by hearing the alarm by the at least one ear of the user;

f) shutting off the source of flowing water by the user;

g) removing the warning device from the structure by the user by detaching the suction cup from the base of the structure; and h) using the structure by the user in a usual fashion.

\* \* \* \* \*